US009086862B2

(12) United States Patent
Hsiao

(10) Patent No.: US 9,086,862 B2
(45) Date of Patent: Jul. 21, 2015

(54) APPARATUS AND METHOD OF PROTECTING ELECTRONIC APPARATUS USING A TEMPERATURE-POWER TABLE FOR AN ELECTRONIC COMPONENT UNDER DIFFERENT SYSTEM AND ENVIRONMENTAL TEMPERATURES

(75) Inventor: Wei-Chung Hsiao, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 183 days.

(21) Appl. No.: 13/366,205

(22) Filed: Feb. 3, 2012

(65) Prior Publication Data

US 2013/0205151 A1 Aug. 8, 2013

(51) Int. Cl.
G06F 1/26 (2006.01)
G06F 1/32 (2006.01)
G06F 1/20 (2006.01)

(52) U.S. Cl.
CPC .............. *G06F 1/206* (2013.01); *G06F 1/3234* (2013.01); *Y02B 60/32* (2013.01)

(58) Field of Classification Search
CPC ..................................................... G06F 1/3203
USPC .................................. 713/323, 320
See application file for complete search history.

(56) References Cited

U.S. PATENT DOCUMENTS

2005/0049729 A1* 3/2005 Culbert et al. ................... 700/50
2009/0299543 A1* 12/2009 Cox et al. ....................... 700/299
2011/0060927 A1* 3/2011 Fillingim et al. ............. 713/320
2011/0161685 A1* 6/2011 Lin et al. ....................... 713/300

FOREIGN PATENT DOCUMENTS

| CN | 101739037 | 6/2010 |
|----|-----------|--------|
| TW | 522300 | 3/2003 |
| TW | I232838 | 4/2010 |
| TW | I327261 | 7/2010 |

* cited by examiner

*Primary Examiner* — Thomas Lee
*Assistant Examiner* — Robert Cassity

(57) ABSTRACT

A controlling method for protecting an electronic apparatus, performed by the electronic apparatus to determine whether the system temperature thereof is overheated, so as to switch the electronic apparatus into a low-power operation mode when the system temperature is overheated. The controlling method is to monitor an electronic component of the electronic apparatus, so as to obtain the current temperature and the current working power of the electronic component and to determine whether the system temperature is overheated according to the current temperature and the current working power. When the system temperature is overheated, an overheating signal is generated to switch the electronic apparatus into the low-power operation mode.

20 Claims, 12 Drawing Sheets

| Tc \ Pc | 5W | 6W | 7W | 8W | 10W | 15W |
|---|---|---|---|---|---|---|
| 100°C | Te=79.3°C Ts=96.5°C | Te=77.3°C Ts=95.2°C | Te=75.3°C Ts=93.8°C | Te=73.2°C Ts=92.4°C | Te=69.1°C Ts=89.6°C | Te=59.1°C Ts=82.8°C |
| 95°C | Te=74.3°C Ts=91.5°C | Te=72.3°C Ts=90.2°C | Te=70.3°C Ts=88.8°C | Te=68.2°C Ts=87.4°C | Te=64.1°C Ts=84.6°C | Te=49.1°C Ts=72.8°C |
| 90°C | Te=69.3°C Ts=86.5°C | Te=67.3°C Ts=85.2°C | Te=65.3°C Ts=83.8°C | Te=63.2°C Ts=82.4°C | Te=59.1°C Ts=79.6°C | Te=49.1°C Ts=72.8°C |
| 80°C | Te=59.3°C Ts=76.5°C | Te=57.3°C Ts=75.2°C | Te=55.3°C Ts=73.8°C | Te=53.2°C Ts=72.4°C | Te=49.1°C Ts=69.6°C | Te=39.1°C Ts=62.8°C |
| 70°C | Te=49.3°C Ts=66.5°C | Te=47.3°C Ts=65.2°C | Te=45.3°C Ts=63.8°C | Te=43.2°C Ts=62.4°C | Te=39.1°C Ts=59.6°C | Te=29.1°C Ts=52.8°C |

Fig. 2

| Tc | | | | | | |
|---|---|---|---|---|---|---|
| 100°C | Oh | Oh | Oh | Oh | N/A | |
| 95°C | Oh | Oh | Oh | Oh | N/A | |
| 90°C | Oh | Oh | N/A | N/A | N/A | |
| 80°C | N/A | N/A | N/A | N/A | N/A | |
| 70°C | N/A | N/A | N/A | N/A | N/A | |
| | 5W | 6W | 7W | 8W | 10W | 15W |
| | | | | | | Pc |

Fig. 3

APPARATUS AND METHOD OF PROTECTING ELECTRONIC APPARATUS USING A TEMPERATURE-POWER TABLE FOR AN ELECTRONIC COMPONENT UNDER DIFFERENT SYSTEM AND ENVIRONMENTAL TEMPERATURES

BACKGROUND

1. Technical Field

This disclosure relates to overheated protection for electronic apparatus, and more particularly relates to an electronic apparatus and a controlling method of protecting the electronic apparatus.

2. Related Art

The system temperature inside an electronic apparatus is governed by the heat generating rate and the cooling efficiency of the electronic apparatus. Furthermore, the cooling efficiency for the electronic apparatus is affected by the environmental temperature outside the electronic apparatus. In other words, the system temperature inside the electronic apparatus is governed by the heat generating rate of the electronic apparatus and the environmental temperature outside the electronic apparatus.

In an ordinary commercial desktop computer or laptop computer, the motherboard has the function of detecting the working power and the temperature of the central processing unit (CPU). The purpose of detecting the working power is to control electrical power consumption; the purpose of detecting the temperature is intended to turn off the computer, reset the computer, or increase the revolution rate of the fan in time to prevent the CPU from burn-out. For example, Taiwan (R. O. C.) Invention Patent 1327261 discloses a method of continuously detecting temperature and power of an electronic component, and adjusting fan's revolution rate according to the temperature and power.

The CPU or the system chip set of the computer can work under very high working temperature. In many commercial products, the allowable working temperature of the CPU or the system chipset is even higher than 100 degree Celsius. However, other components in the computer, such as CPU socket, PCB of a motherboard, casing, etc., are usually made of plastic. The plastic material gets deteriorated from the temperature. Therefore, the aforementioned plastic components are easily damaged under high temperature even if the temperature is lower than the allowable working temperature of the CPU or the system chipset.

In the motherboard, the detection mechanism of temperature and power is integrated in the CPU or the system logic chipset. However, the detection mechanism of system temperature is in absence, and the detection mechanism for obtaining the environmental temperature is also in absence in the motherboard. That is to say, overheating alarms for system temperature or environmental temperature will not be issued by the motherboard.

To detect the system temperature or the environmental temperature, additional thermal transducers are required. For example, the Taiwan (R. O. C.) Invention Patent 1323838 discloses a method of detecting the environmental temperature with an environmental temperature detector and optimizing the revolution rate of a fan in an electronic apparatus. However, 1323838 is directed to overheating protection for the CPU. The overheating protection for the CPU socket, the PCB of motherboard, the casing of the laptop computer, etc., is in absence although theses components are easily damaged by the high temperature. In addition, the additional thermal transducers complicate the circuit design and increase the manufacturing cost of the electronic apparatus.

SUMMARY

In an electronic apparatus in the art, detection mechanism of system temperature and environmental temperature is in absence, such that components with low heat generating rate and low allowable working temperature are operated without overheating protection; or additional thermal transducers, which complicate the circuit design and increase manufacturing cost, are required for detecting system temperature and environmental temperature.

Accordingly, this disclosure discloses a controlling method for protecting an electronic apparatus. The electronic apparatus at least includes an electronic component, and an internal temperature of the electronic apparatus is defined as a system temperature.

The controlling method is to detect a current temperature and a current working power of the electronic component through detection elements; and then, to determine whether the system temperature is overheated according to the current temperature and the current working power. According to the controlling method, when the system temperature Ts is overheated, an overheating signal is generated to switch the electronic apparatus into a low-power operation mode.

This disclosure further discloses an electronic apparatus to perform the above controlling method. The electronic apparatus includes an electronic component, a temperature-detection element, a power-detection element, and a decision module.

The electronic component has a current temperature and a current working power. The temperature-detection element is used to detect the current temperature of the electronic component, and the power-detection element is used to detect the current working power of the electronic component.

The decision module is used to determine whether the system temperature is overheated according to the current temperature and the current working power. When the system temperature is overheated, the decision module generates an overheating signal to switch the electronic apparatus into a low-power operation mode.

The low-power operation mode comprises reducing the operating clock rate of the electronic apparatus, switching the electronic apparatus into power-off mode, switching the electronic apparatus into suspend mode, switching the electronic apparatus into low-power sleep mode, and raising the revolution rate of a fan in the electronic apparatus. According to this disclosure, only the current temperature and the current working power of the electronic component are required to determine the system temperature. The temperature-detection element and power-detection element for detecting the current temperature and the current working power can be easily integrated into the electronic component, additional thermal transducers for detecting the system temperature and the environmental temperature on the motherboard are not required, and the temperature-detection mechanism of the electronic apparatus is simplified.

BRIEF DESCRIPTION OF THE DRAWINGS

The present invention will become more fully understood from the detailed description given herein below for illustration only, and thus not limitative of the present invention, wherein:

FIG. 2 is a table (I) of temperature-power according to the first embodiment;

FIG. 3 is a table (II) of temperature-power according to the first embodiment;

DETAILED DESCRIPTION

Figure 1:
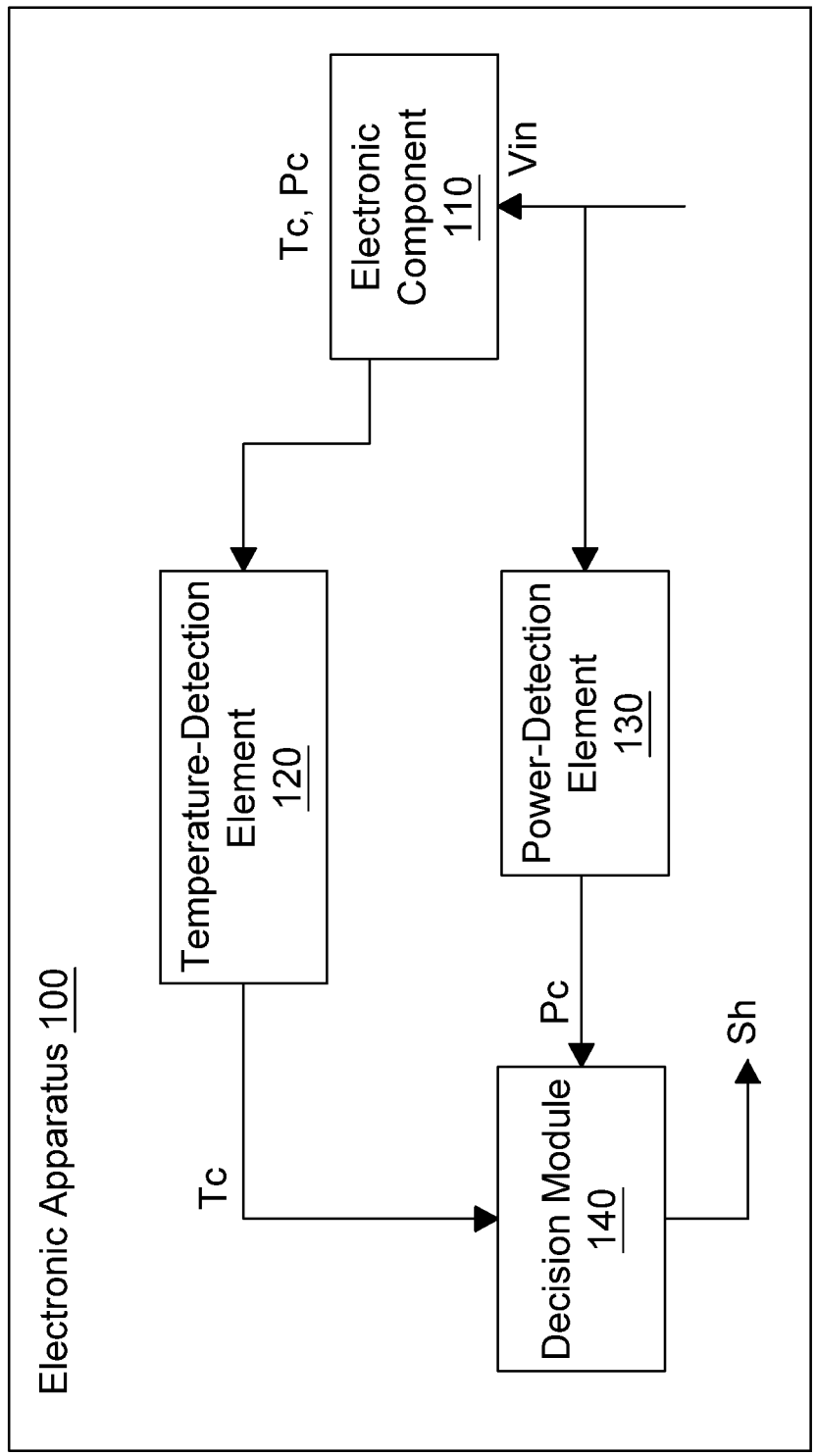
FIG. 1 is a circuit block diagram of an electronic apparatus according to a first embodiment.

Please refer to FIG. 1, in which an electronic apparatus 100 according to a first embodiment is illustrated. An internal temperature of the electronic apparatus 100 is defined as a system temperature Ts. Examples of the electronic apparatus 100 include a laptop computer, a Personal Digital Assistant, a Portable Navigation Device, a tablet computer, a digital media player, etc. Examples of the electronic apparatus 100 also include desktop computer, server computer, etc.

The casing or the printed circuit board (PCB) of the electronic apparatus 100 is usually made of plastic, and the allowable working temperature of plastic is relative low. During the operation of the electronic apparatus 100, the system temperature Ts is varied with the operating state of the electronic apparatus 100. Usually, the system temperature Ts will not damage the electronic component 110 which is allowed to operate under high temperature, but the casing or the PCB is easily damaged if the system temperature Ts is increased to a high degree. The electronic apparatus 100 of this disclosure monitors the system temperature Ts during the operation of the electronic apparatus 100. If it is necessary, the operating mode of the electronic apparatus 100 is switched to prevent any component of the electronic apparatus 100 from being damaged by high temperature.

Please refer to FIG. 1, in which the electronic apparatus 100 includes an electronic component 110, a temperature-detection element 120, a power-detection element 130, and a decision module 140.

Usually, the electronic component 110 is the major heat source inside the electronic apparatus 100. During operation, the electronic component 110 has a temperature and a power consumption rate. The power consumption rate is defined as a current working power Pc, and the temperature is defined as a current temperature Tc.

An example of the temperature-detection element 120 is a thermal couple or a thermal resistor, which contacts the electronic component 110 or is integrated inside the electronic component 110. The temperature-detection element 120 is used to detect the current temperature Tc of the electronic component 110, and converts the current temperature Tc into a corresponding electrical signal. The electrical signal is usually a voltage-signal. Another example of the temperature-detection element 120 is an optical temperature measuring device. The optical temperature measuring device detects the current temperature Tc through heat radiation without contacting the electronic component 110, and converts the current temperature Tc into a corresponding electrical signal.

The power-detection element 130 is electrically coupled to the electronic component 110 for detecting the current working power Pc of the electronic component 110. In an example, the power-detection element 130 is connected to a voltage-input pin Vin of the electronic component 110, so as to obtain the current and the voltage supplied to the electronic component 110. And the current working power Pc of the electronic component 110 is derived according to the current and the voltage.

The temperature-detection element 120 and the power-detection element 130 are electrically coupled to the decision module 140, such that the decision module 140 obtains the current temperature Tc and the current working power Pc via the temperature-detection element 120 and the power-detection element 130. The decision module 140 determines whether the system temperature Ts is overheated according to the current temperature Tc and the current working power Pc. When the system temperature Ts is overheated, the decision module 140 generates an overheating signal Sh to switch the electronic apparatus 100 into a low-power operation mode. The low-power operation mode includes reducing the operating clock rate of the electronic component 110, switching the electronic apparatus 100 into a power-off mode or a suspend mode or a low-power sleep mode of Advanced Configuration and Power Interface (ACPI), or raising the revolution rate of a fan in the electronic apparatus 100. Switching into the low-power operation mode is for the purpose of reducing the heat generating rate of the electronic component 110 or increasing cooling efficiency for the electronic component 110.

Please refer to FIG. 1. In one example of the first embodiment, a temperature threshold value and a power threshold value are set in the decision module 140. The decision module 140 continuously receives the current temperature Tc and the current working power Pc, compares the current temperature Tc with the temperature threshold value, and then compares the current working power Pc with the power threshold value. When the current temperature Tc is higher then the temperature threshold value and the current working power Pc is lower than the power threshold value, the decision module 140 determines that the system temperature Ts is overheated and the decision module 140 generates an overheating signal Sh to switch the electronic apparatus 100 into the low-power operation mode.

Please refer to FIG. 2. In another example of the first embodiment, the decision module 140 determines whether the system temperature Ts is overheated according to a temperature-power relation.

As shown in FIG. 1 and FIG. 2, the decision module 140 loads the temperature-power relation. The temperature-power relation includes a plurality set of temperature and power. Each set of temperature and power corresponds to a system temperature tag. The decision module 140 obtains a corresponding system temperature tag according to the current temperature Tc and the current working power Pc. And then the decision module 140 analyzes the system temperature tag to determine whether the system temperature Ts is overheated.

In detail, the system temperature tag includes a system temperature value representing a system temperature Ts under an operation condition. To obtain the system temperature values, plurality sets of temperature and power are predetermined as system temperature Ts and current working power Pc. Then the operation state of the electronic component 110 and the environmental temperature Te is adjusted, so as to make the current temperature Tc and the system temperature Ts Pc match one of the sets of temperature and power. An external temperature detector is applied to detect the system temperature Ts of the electronic apparatus 100, so as to obtain a system temperature value corresponding to this set of current temperature Tc and system temperature Ts. With the system temperature value, the decision module 140 can directly determine whether the system temperature Ts is overheated according to the system temperature value.

Take FIG. 2 as an illustration, the temperature threshold value of the system temperature Ts is 85 degree Celsius. Serving as the electronic component 110, the allowable working temperature of the CPU 110a is much higher than 85 degree Celsius, but the material of the casing or PCB is easily damaged when the temperature is higher than 85 degree Celsius. The system temperature Ts is governed by the heat generating rate (current working power Pc) of the electronic component 110 and environmental temperature Te outside the electronic component 110. The current temperature Tc of the electronic component 110 is governed by the system temperature Ts and the heat generating rate (current working power Pc). Therefore, a set of system temperature Ts and environmental temperature Te can be derived by the current temperature Tc and the current working power Pc. Take 8W of current working power Pc as an illustration, different current temperature Tc leads to different system temperature Ts and environmental temperature Te. Under same current working power Pc, higher environmental temperature Te leads to higher system temperature Ts and higher current temperature Tc of the electronic component 110.

Through the table illustrated in FIG. 2, the system temperature Ts and the environmental temperature Te are not required to be directly detected during the operation of the electronic apparatus 100. Once the current temperature Tc and the current working power Pc are obtained, the system temperature Ts and the environmental temperature Te can be derived from the table. If the system temperature Ts is higher than 85 degree Celsius (system temperature tags located above the dashed-line in FIG. 2), the decision module 140 determines that the system temperature Ts is overheated, and the decision module 140 generates an overheating signal Sh to switch the electronic apparatus 100 into the low-power operation mode. Another approach is to move the electronic apparatus 100 to a place with lower environmental temperature Te when the system temperature Ts is overheated.

To determine the temperature threshold value, experiments are performed to find out allowable working temperatures of components in the electronic apparatus 100. And then the lowest allowable working temperature among these allowable working temperatures of the components is determined as the temperature threshold value of the system temperature Ts.

Through the above approaches, plural sets of temperature and power are derived, and each set of temperature and power corresponds to a system temperature tag. Then the table of temperature-power as shown in FIG. 2 is obtained to serve as the temperature-power relation. If the obtained current temperature Tc and current working power Pc can not directly applied to derive corresponding values in the table, values near the obtained current temperature Tc and current working power Pc can be used. Or interpolation can be performed to derive the system temperature Ts and environmental temperature Te.

Please refer to FIG. 3; during the derivation of the system temperature tag, the derived system temperature value can be directly applied to determine whether the corresponding temperature and power cause the system temperature Ts overheated. If the temperature and the power makes the system temperature Ts overheated, an overheating mark Oh is directly included in the system temperature tag, so as to mark that such a set of temperature and power will make the electronic apparatus 100 overheated. The corresponding system temperature value and environmental temperature value can be omitted in the system temperature tag. Therefore, the decision module 140 directly analyzes whether the system temperature tag includes the overheating mark Oh and neglects the system temperature value and the environmental temperature value. When the obtained system temperature tag includes the overheating mark Oh, the decision module 140 directly determines that the system temperature Ts is overheated, and generates an overheating signal Sh to switch the electronic apparatus 100 into the low-power operation mode.

Figure 4:
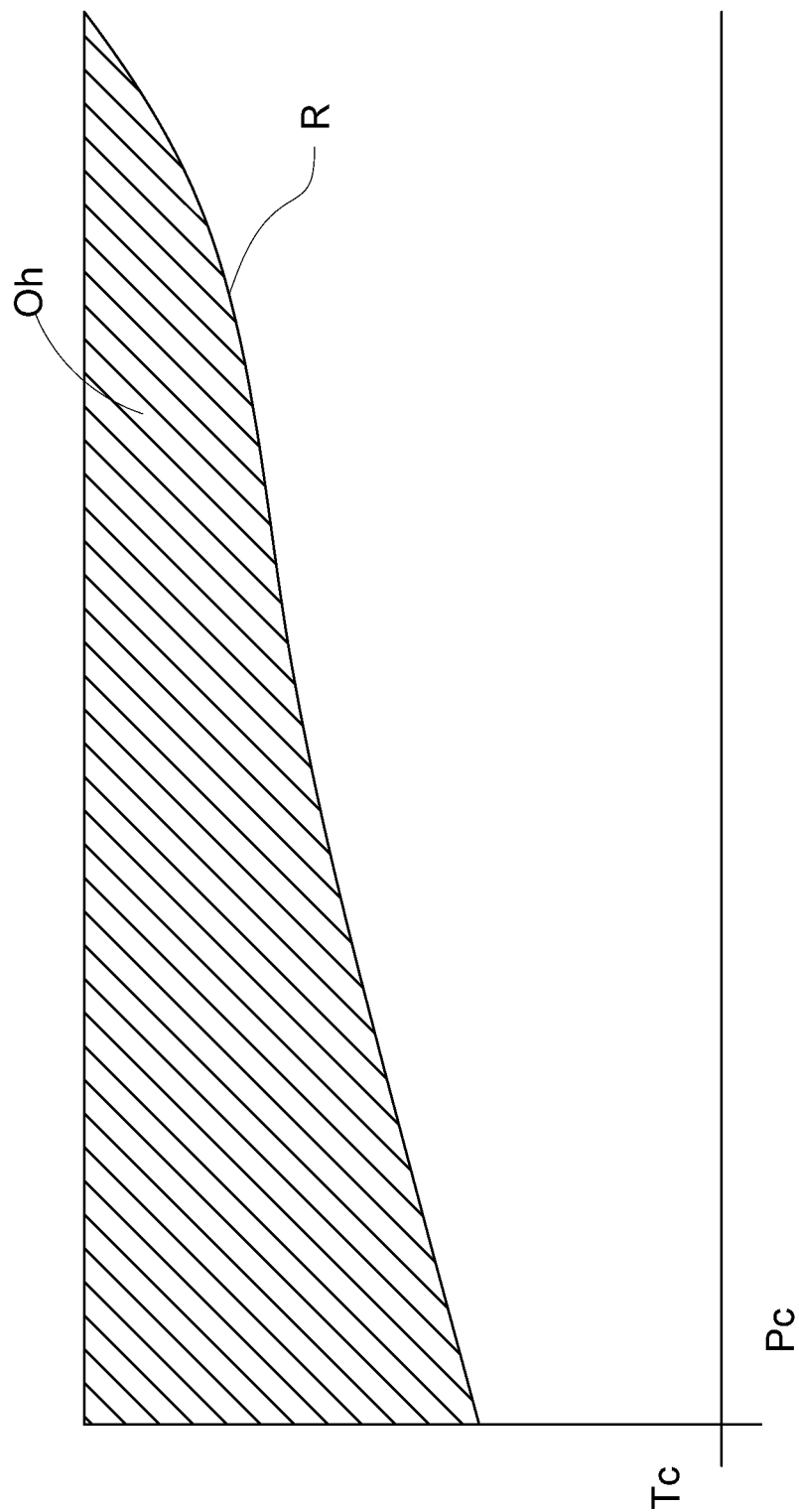
FIG. 4 is a relation curve R of temperature-power according to the first embodiment.

Please refer to FIG. 4. In another example, the temperature-power relation is a relation curve R of temperature-power. To obtain the relation curve R of temperature-power, plurality sets of temperature and power are predetermined as system temperature Ts and current working power Pc. Experiments are performed to find out the current temperature Tc and the current working power Pc that will make the system temperature Ts reaches a critical value, so as to draw the relation curve R of temperature-power. Divided by the relation curve R of temperature-power, in the part corresponding to relative high temperature and relative low power the obtained system temperature tag includes the overheating mark Oh. Therefore, the decision module 140 determines whether the system temperature Ts is overheated according to a relation curve R of temperature-power. In this example, the decision module 140 determines whether the system temperature Ts is overheated without obtaining system temperature value.

Figure 5:
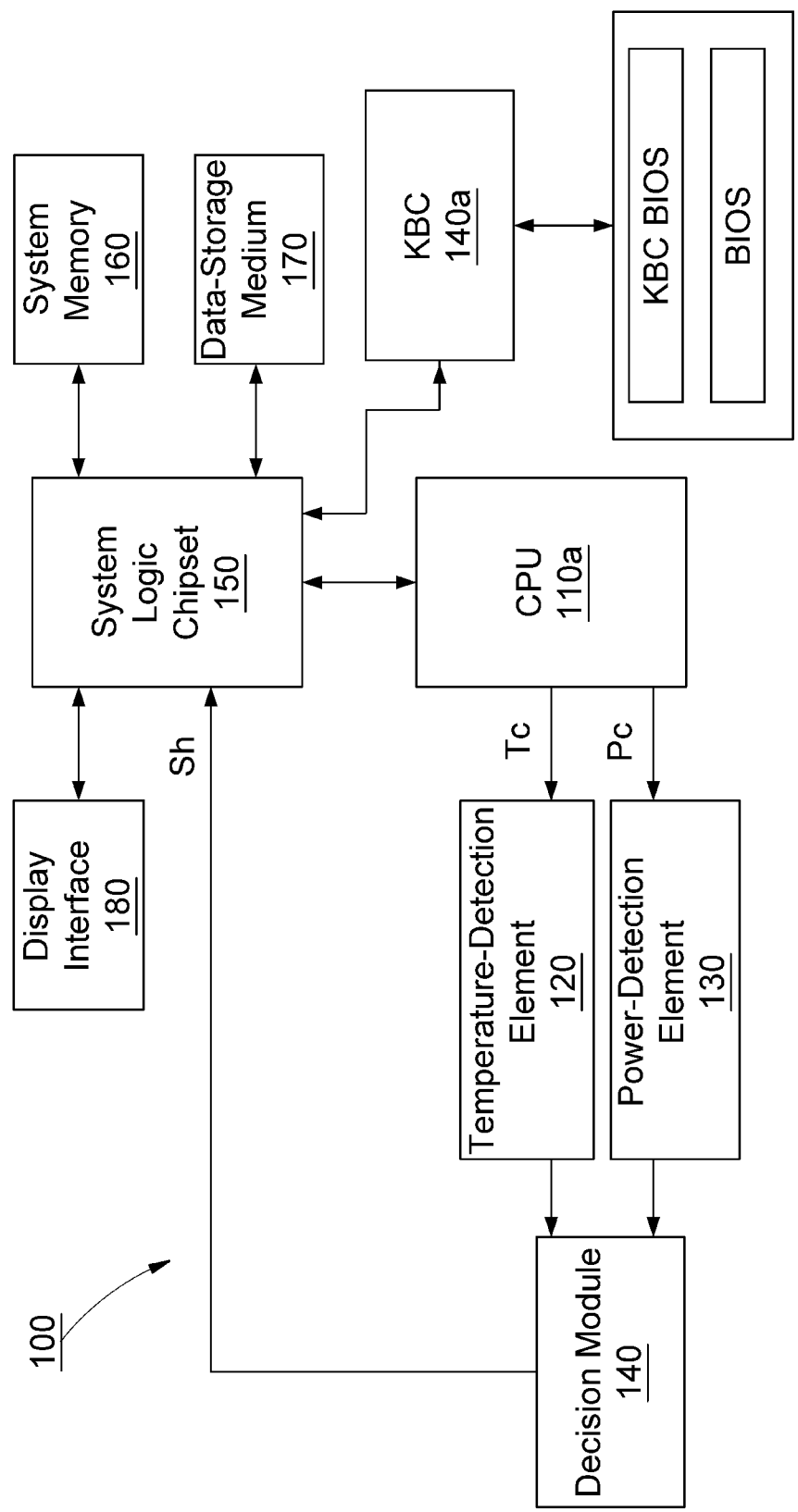
FIG. 5 is a circuit block diagram (I) of an electronic apparatus according to a second embodiment.

Please refer to FIG. 5, in which an electronic apparatus 100 according to a second embodiment is illustrated. The electronic apparatus 100 includes a temperature-detection element 120, a power-detection element 130, and a decision module 140. The electronic apparatus 100 further includes a system electronic circuit. The system electronic circuit includes a central processing unit (CPU) 110a, a system logic chipset 150, a system memory 160, a data-storage medium 170, a display interface 180, and a keyboard controller (KBC) 140a. The system logic chipset 150 includes north bridge chip and south bridge chip respectively provide different data BUS.

The system memory 160, the data-storage medium 170, and the display interface 180 are electrically coupled to the system logic chipset 150, so as to be connected to the CPU 110a via the data BUS of the system logic chipset 150. The display interface 180 is provided for generating a display signal. An operating system (OS) is installed to the data-storage medium 170, and the OS is loaded to the system memory 160 and executed by the CPU 110a.

In General, the CPU 110a is the component that has the highest power consumption, the highest heat generating rate, and the highest working temperature in the electronic apparatus 100. Therefore, in the second embodiment, the CPU 110a serves as the electronic component 110 in the first embodiment, and the temperature-detection element 120 and the power-detection element 130 is used to detect the current temperature Tc and the current working power Pc of the CPU 110a. It is noted that the other component in the electronic apparatus 100 can serve as the electronic component 110.

An example of the decision module 140 is a microprocessor or an embedded controller (EC) in the system electronic circuit, and is connected to the CPU 110a via the system logic chipset 150. The microprocessor or the EC executes a programmable instruction, so that the microprocessor or the EC analyzes the current temperature Tc and the current working power Pc, and generates the overheating signal Sh to trigger the CPU 110a to executing a process for switching the electronic apparatus 100 into the low-power operation mode. The low-power operation mode includes reducing the operating clock rate of the electronic apparatus 100, switching the electronic apparatus 100 into a power-off mode or a suspend mode or a low-power sleep mode of ACPI, or raising the revolution rate of a fan in the electronic apparatus 100. Reducing the operating clock rate of the electronic apparatus 100 is to reduce the current working power Pc directly. The suspend mode and the low-power sleep mode are also to reduce the current working power Pc to a minimum degree that maintain the CPU 110a in a state to be waken up. The power-off mode is to cut off the power supply to CPU 110a and other components, and maintains the EC or KBC 140a at a low-power stand by state (to wait the power-on signal issued by the power button). Switching into the low-power operation mode is directed to reduce the heat generating rate of the CPU 110a. Raising the revolution rate of a fan in the electronic apparatus 100 is directed to increase cooling efficiency for the CPU 110a.

Figure 6:
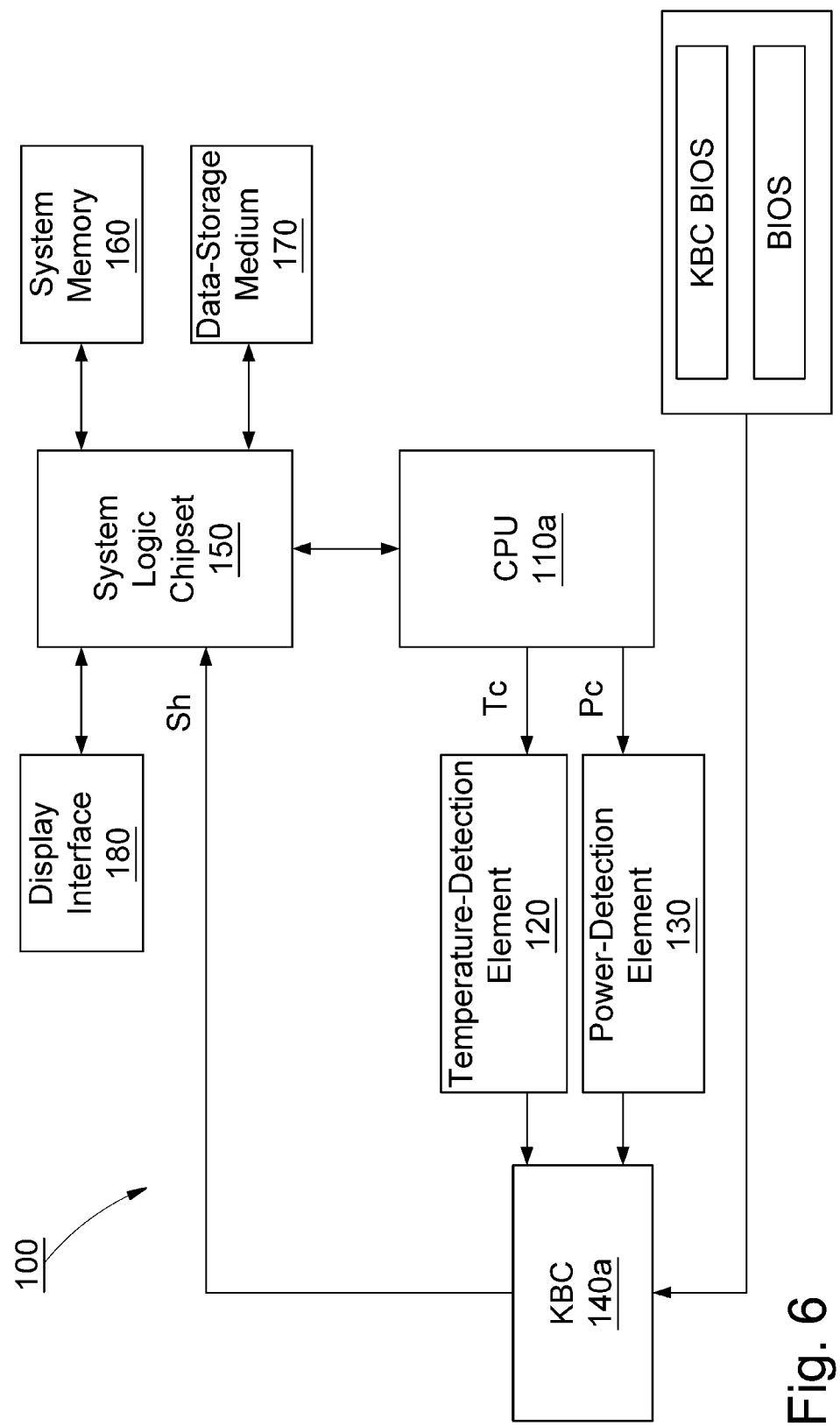
FIG. 6 is a circuit block diagram (II) of an electronic apparatus according to a third embodiment.

Please refer to FIG. 6, in which an electronic apparatus 100 according to a third embodiment is illustrated, the electronic apparatus 100 is similar to that disclosed in the second embodiment. In the third embodiment, the KBC 140a is coupled to the CPU 110a via the system logic chipset 150, and KBC BIOS of the KBC 140a further includes a programmable instruction. After loading the KBC BIOS and executing the programmable instruction, the KBC 140a determines whether the system temperature Ts is overheated according to the current temperature Tc and the current working power Pc. That is, in the third embodiment the decision module 140 is the KBC 140a of the system electronic circuit.

Figure 7:
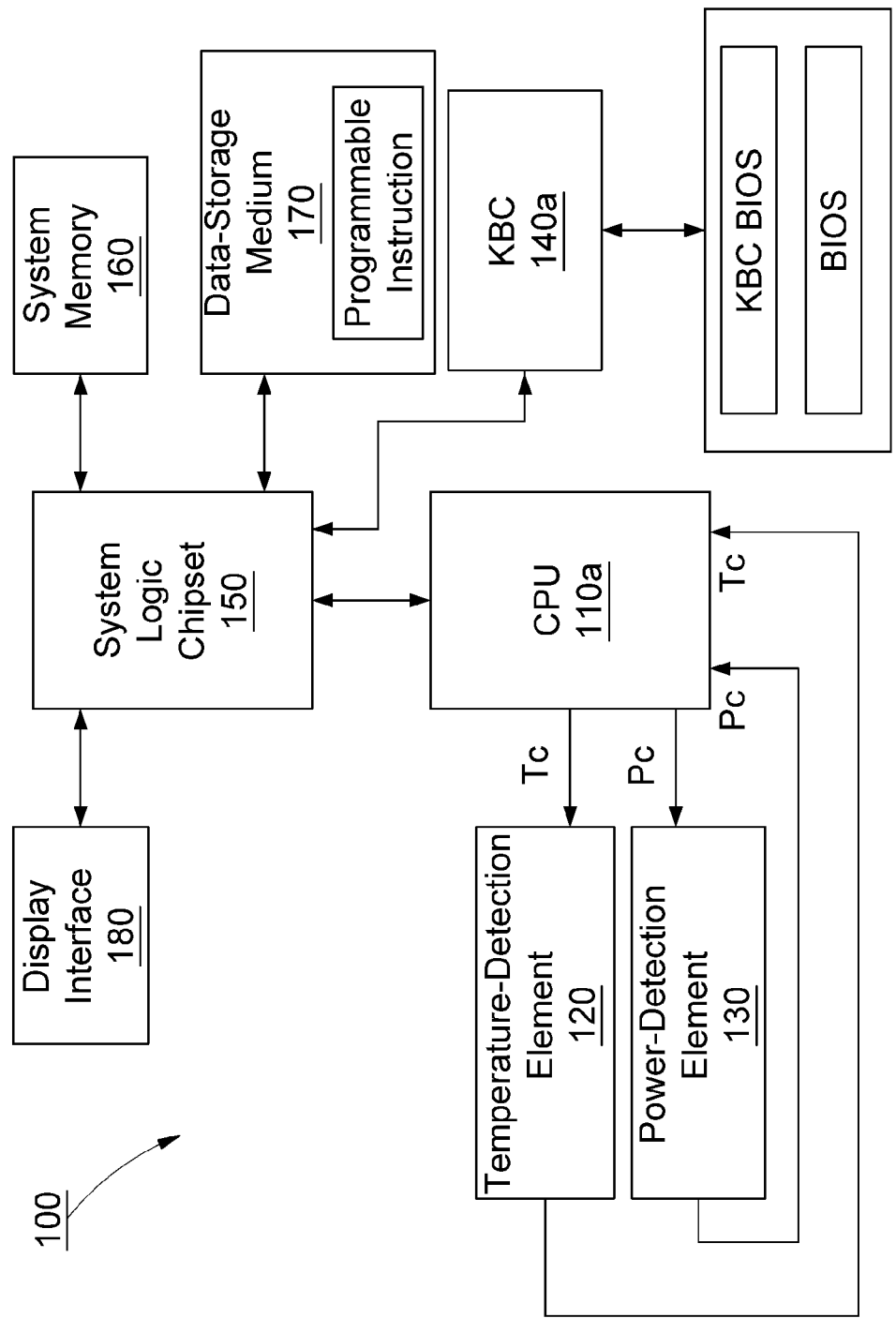
FIG. 7 is a circuit block diagram (II) of an electronic apparatus according to a fourth embodiment.

As shown in FIG. 7, an electronic apparatus 100 according to a fourth embodiment is illustrated; the electronic apparatus 100 is similar to that disclosed in the second embodiment. In the fourth embodiment, the data-storage medium 170 further stores a programmable instruction. After the electronic apparatus 100 is powered on, the CPU 110a loads and executes the programmable instruction from the data-storage medium 170, and the CPU 110a determines whether the system temperature Ts is overheated according to the current temperature Tc and the current working power Pc. That is, in the fourth embodiment the decision module 140 is implemented by the CPU 110a executing a programmable instruction.

Figure 8:
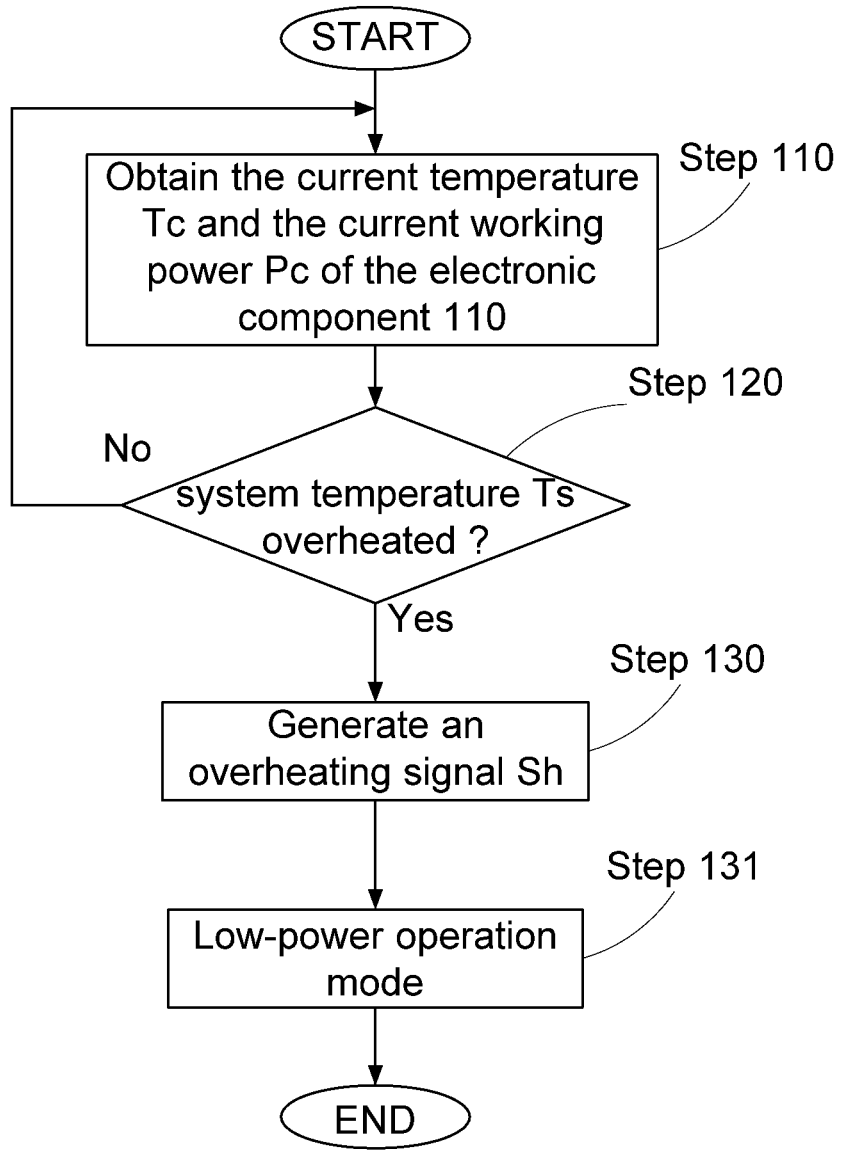
FIG. 8 is a flow chart (I) according to a fifth embodiment.

Please refer to FIG. 8, in which a controlling method of protecting the electronic apparatus 100 according to a fifth embodiment is illustrated. As shown in FIG. 1, the electronic apparatus 100 at least includes an electronic component 110, and an internal temperature of the electronic apparatus 100 is defined as a system temperature Ts.

According to the method, the decision module 140 obtains the current temperature Tc and the current working power Pc of the electronic component 110, as shown in Step 110.

And then, the decision module 140 determines whether the system temperature Ts is overheated according to the current temperature Tc and the current working power Pc, as shown in Step 120. When the system temperature Ts is overheated, the decision module 140 generates an overheating signal Sh, as shown in Step 130. If the decision module 140 determines that the system temperature Ts is not overheated, the decision module 140 refreshes the current temperature Tc and the current working power P of the electronic component 110, as shown in Step 110.

The overheating signal Sh is transmitted to the system electronic circuit of the electronic apparatus 100. For example, the overheating signal Sh is transmitted to the CPU 110a. According to the overheating signal Sh, the CPU 110a executes a process for switching the electronic apparatus 100 into the low-power operation mode, as shown in Step 131. The low-power operation mode includes switching the electronic apparatus 100 into suspend mode, switching the electronic apparatus 100 into low-power sleep mode, switching the electronic apparatus 100 into power-off mode, or raising the revolution rate of a fan in the electronic apparatus 100.

Figure 9:
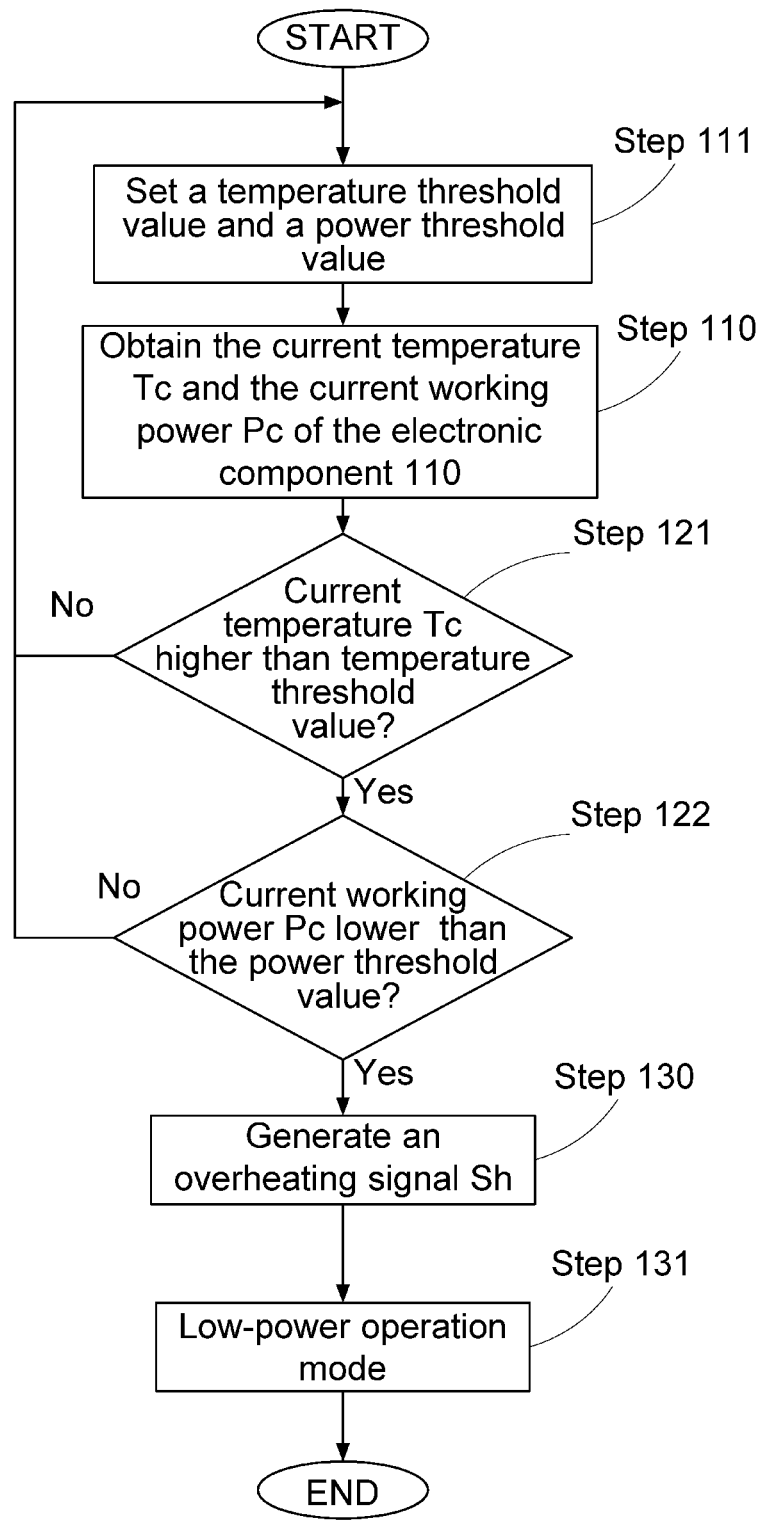
FIG. 9 is a flow chart (II) according to the fifth embodiment.

Please refer to FIG. 9. In an example, the steps for determining whether the system temperature Ts is overheated are described hereinafter.

Before obtaining the current temperature Tc and the current working power Pc (Step 110), a temperature threshold value and a power threshold value are set in the decision module 140, as shown in Step 111. Step 111 can performed after the Step 110 is performed, or the Step 110 and Step 111 can be performed simultaneously. In an example, the Step 111 is performed once after the electronic apparatus 100 is booted, such that it is not required to perform Step again 111 in the following process.

Details of the Step 120 are addressed hereinafter. According to the data obtained in Step 110, the decision module 140 determines whether the current temperature Tc is higher than the temperature threshold value, and determines whether the current working power Pc is lower than the power threshold value, as shown in Step 121 and Step 122.

The order of Step 121 and Step 122 is not limited. Once obtaining the result of that the current temperature Tc is lower than the temperature threshold value or the result of that the current working power Pc is higher than the power threshold value, the decision module 140 returns to Step 140 to refresh the current temperature Tc and the current working power Pc.

If the Step 121 and Step 122 are combined into one step, the decision module 140 has to complete all the steps in Step 121 and Step 122, and then the decision module 140 determines whether the current temperature Tc is lower than the temperature threshold value or the current working power Pc is higher than the power threshold value. And then, the decision module 140 determines whether to refresh the current temperature Tc and the current working power Pc.

After Step 121 and Step 122, if the current temperature Tc is higher than the temperature threshold value while the current working power Pc is lower than the power threshold value, the decision module 140 determines that the system temperature Ts is overheated, and the decision module 140 generates an overheating signal Sh to switch the electronic apparatus 100 into the low-power operation mode, as shown in Step 130 and Step 131.

Figure 10:
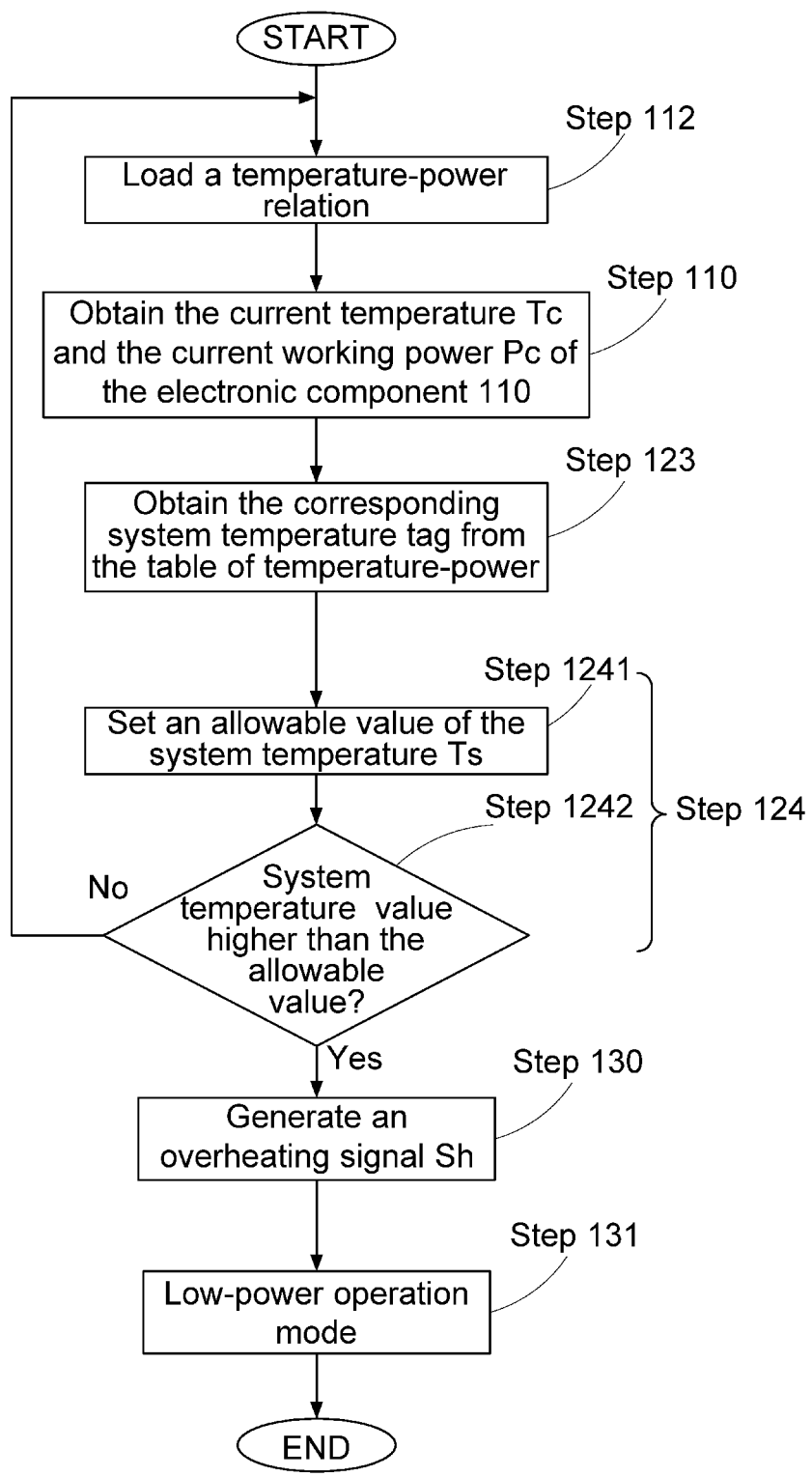
FIG. 10 is a flow chart (III) according to the fifth embodiment.

Please refer to FIGS. 2 and 10. In an example, the steps for determining whether the system temperature Ts is overheated are described hereinafter.

Before obtaining the current temperature Tc and current working power Pc (Step 110), the decision module 140 loads a temperature-power relation, as shown in Step 112. Step 112 can be performed after the Step 110 is performed, or the Step 110 and Step 112 can be performed simultaneously. In this example, the Step 112 is performed once after the electronic apparatus 100 is booted, such that it is not required to perform Step 112 again in the following process.

Please refer to FIG. 2, the temperature-power relation is a table of temperature-power and the table of temperature-power includes plurality sets of temperature and power. Each set of temperature and power corresponds to a system temperature tag. According to the current temperature Tc and the current working power Pc obtained in Step 110, the decision module 140 obtains the corresponding system temperature tag from the table of temperature-power, as shown in Step 123.

Then the decision module 140 analyzes the system temperature tag to determine whether the system temperature Ts of the electronic apparatus 100 is overheated, as shown in Step 124.

In detail, the system temperature tag includes a system temperature value and an environmental temperature value. The system temperature value corresponds to the system temperature Ts of the electronic apparatus 100, and the environmental temperature value corresponds to the environmental temperature Te surrounding the electronic apparatus 100. The decision module 140 determines the system temperature value to serve as the system temperature Ts, so as to determine whether the system temperature Ts is overheated.

Please refer to FIG. 10. Step 124 further includes the following steps.

An allowable value of the system temperature Ts is set in the decision module 140, as shown in Step 1241. And the decision module 140 compares the system temperature value with the allowable value of the system temperature Ts, so as to determine whether the system temperature value is higher than the allowable value of the system temperature Ts, as shown in Step 1242. When the system temperature value is higher than the allowable value of the system temperature Ts, the decision module 140 determines that the system temperature Ts is overheated, and the decision module 140 generates an overheating signal Sh to switch the electronic apparatus 100 into the low-power operation mode, as shown in Step 130 and Step 131.

Figure 11:
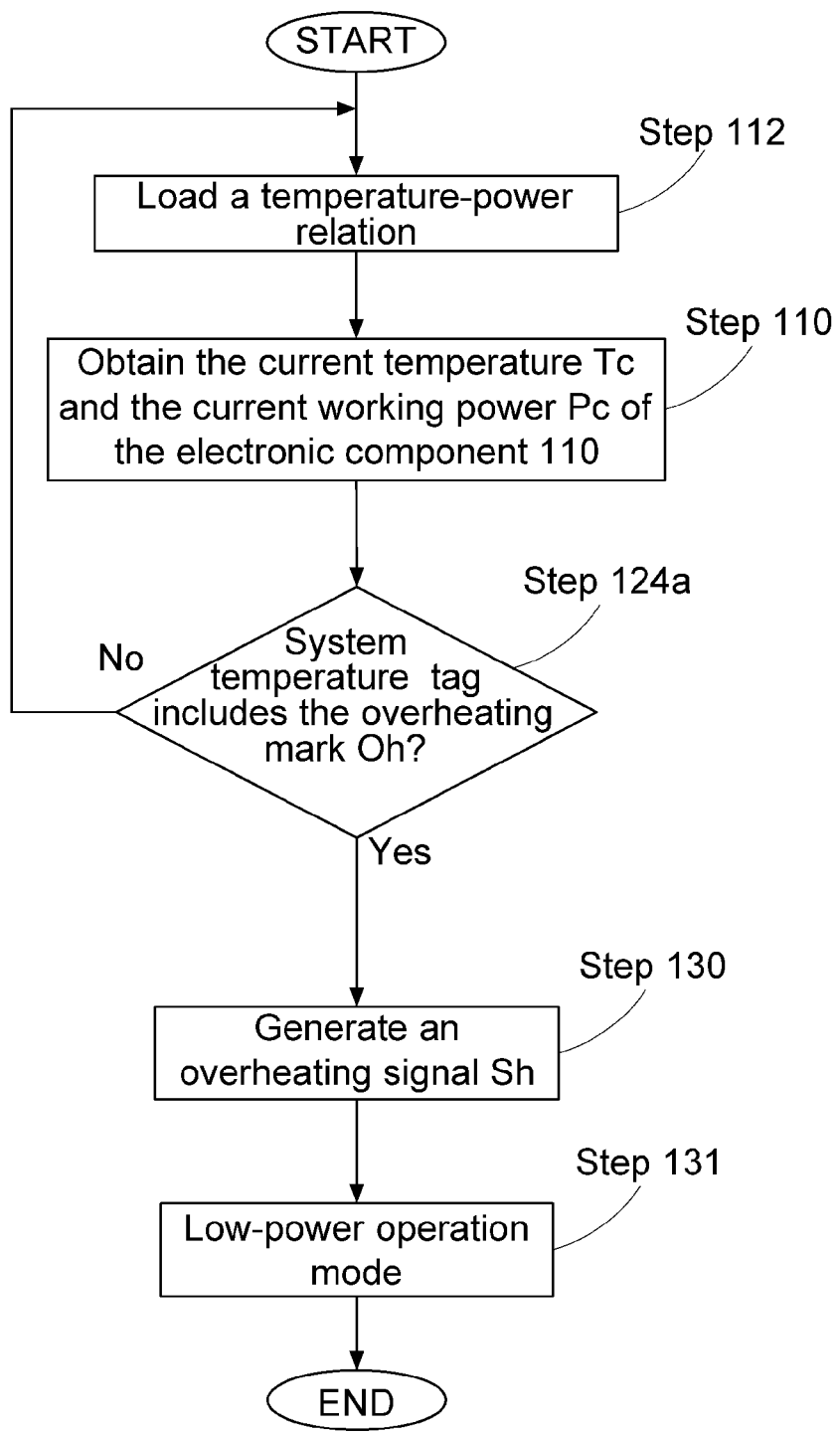
FIG. 11 is a flow chart (IV) according to the fifth embodiment.

Please refer to FIGS. 3 and 11. In an example, at least one of the system temperature tags includes an overheating mark Oh for marking that such a set of temperature and power will make the system temperature Ts of the electronic apparatus 100 overheated. Therefore, Step 124 is modified; the decision module 140 directly analyzes whether the system temperature tag includes the overheating mark Oh, as shown in Step 124*a*.

When the obtained system temperature tag includes the overheating mark Oh, the decision module 140 determines that the system temperature Ts is overheated, and the decision module 140 generates an overheating signal Sh to switch the electronic apparatus 100 into the low-power operation mode, as shown in Step 130 and Step 131.

Figure 12:
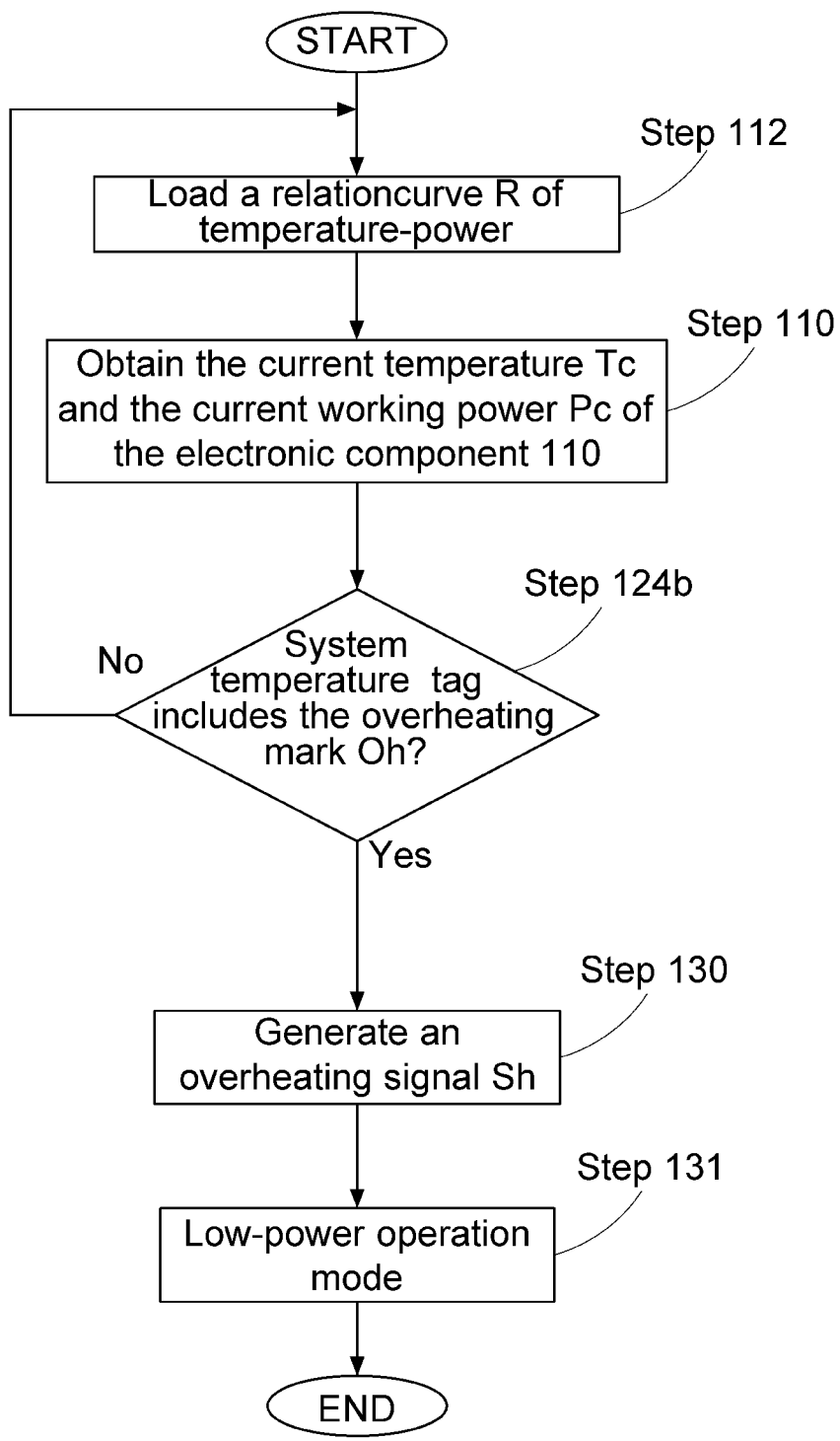
FIG. 12 is a flow chart (V) according to the fifth embodiment.

Please refer to FIGS. 4 and 12. In another example, the temperature-power relation is a relation curve R of temperature-power. Divided by the relation curve R of temperature-power, in the part corresponding to relative high temperature and relative low power the obtained system temperature tag includes the overheating mark Oh. Therefore, Step 124 is modified; the decision module 140 directly analyzes the position of the system temperature tag relative to the relation curve R of temperature-power, so as to analyze whether the system temperature tag includes the overheating mark Oh, as shown in Step 124*b*. The decision module 140 determines whether the system temperature Ts is overheated according to a relation curve R of temperature-power without obtaining system temperature value.

According to this disclosure, only the current temperature Tc and the current working power Pc of the electronic component 110 are required to determine the system temperature Ts. After analyzing the current temperature Tc and the current working power Pc, the system temperature Ts and the environmental temperature Te are obtained. In some examples of this disclosure, the obtained data can be used to determine whether the system temperature Ts is overheated without obtaining the system temperature Ts and comparing temperature values. The temperature-detection element 120 for the current temperature Tc and the power-detection element 130 for current working power Pc can be integrated into the electronic component 110, so as to simplify the temperature detection mechanism and the additional temperature detectors for system temperature Ts and environmental temperature Te are not required in this disclosure.

What is claimed is:

1. A controlling method of protecting an electronic apparatus, wherein the electronic apparatus at least comprises an electronic component and an internal temperature of the electronic apparatus is defined as a system temperature, comprising:
    pre-defining a temperature-power table in which a plurality of sets of temperature and working power of the electronic component under a condition of a plurality of environmental temperatures of the electronic device are associated with system temperature tags indicating a corresponding system temperature of the electronic apparatus;
    obtaining a current temperature and a current working power of the electronic component;
    obtaining the system temperature tag associated with the current temperature and the current working power, and generating an overheating signal when the system temperature tag indicates that the system temperature is overheated; and
    switching the electronic apparatus into a low-power operation mode according to the overheating signal.

2. A controlling method of protecting an electronic apparatus, wherein the electronic apparatus at least comprises an electronic component and an internal temperature of the electronic apparatus is defined as a system temperature, comprising:
    pre-defining a temperature threshold value and a power threshold value at which the system temperature is overheated when a temperature of the electronic component exceeds the temperature threshold value and a working power of the electronic component is lower than the power threshold value ;
    obtaining a current temperature and a current working power of the electronic component;
    determining whether the current temperature is higher than the temperature threshold value and determining whether the current working power is lower than the power threshold value;
    when the current temperature is higher than the temperature threshold value and the current working power is lower than the power threshold value, defining the system temperature is overheated and generating an overheating signal; and
    switching the electronic apparatus into a low-power operation mode according to the overheating signal.

3. The controlling method as claimed in claim 2, wherein when the current temperature is lower than the temperature threshold value or when the current working power is higher than the power threshold value, refreshing the current temperature and the current working power.

4. The controlling method as claimed in claim 2, wherein when the current temperature is lower than the temperature threshold value, refreshing the current temperature and the current working power.

5. The controlling method as claimed in claim 2, wherein when the current working power is higher than the power threshold value, refreshing the current temperature and the current working power.

6. The controlling method as claimed in claim 1, wherein the low-power operation mode comprises reducing the operating clock rate of the electronic apparatus, switching the electronic apparatus into a suspend mode, switching the electronic apparatus into a low-power sleep mode, switching the electronic apparatus into a power-off mode, or raising the revolution rate of a fan in the electronic apparatus.

7. The controlling method as claimed in claim 1, wherein each system temperature tag includes a system temperature value corresponding to the associated set of temperature and working power of the electronic component, and the step of generating the overheating signal comprises:

comparing the system temperature value with a threshold value; and generating the overheating signal when the system temperature value exceeds the threshold value.

8. The controlling method as claimed in claim 7, wherein each system temperature tag includes an environmental temperature value corresponding to the associated set of temperature an working of the electronic component, wherein the environmental temperature value corresponds to the environmental temperature around the electronic apparatus.

9. The controlling method as claimed in claim 1, wherein the system temperature is indicated by each system temperature tag corresponding to an overheated system temperature of the electronic apparatus including an overheating mark, and the step of generating the overheating signal comprises:

analyzing the system temperature tag to determine whether it contains the overheating mark; and generating the overheating signal when the overheating mark is present.

10. An electronic apparatus, in which an internal temperature of the electronic apparatus is defined as a system temperature, the electronic apparatus comprising:

an electronic component;

a temperature-detection element, for detecting the current temperature of the electronic component;

a power-detection element, for detecting the current working power of the electronic component;

a pre-defined temperature-power table in which a plurality of sets of temperature and working power of the electronic component under a condition of a plurality of environmental temperatures of the electronic device are associated with system temperature tags indicating a corresponding system temperature of the electronic apparatus; and a decision module configured to obtain a current temperature and a current working power of the electronic component, obtain the system temperature tag associated with the current temperature and the current working power, and generate an overheating signal when the system temperature tag indicates that the system temperature is overheated, so as to switch the electronic apparatus into a low-power operation mode.

11. The electronic apparatus as claimed in claim 10, further comprising:

a system electronic circuit, at least comprising a central processing unit, a system logic chipset, a system memory, a data-storage medium, and a display interface; wherein the central processing unit, the system memory, the data-storage medium, and the display interface are electrically coupled to the system logic chipset.

12. The electronic apparatus as claimed in claim 11, wherein the decision module is a microprocessor, an embedded controller, or a keyboard controller of the system electronic circuit, and is coupled to the central processing unit via the system logic chipset.

13. The electronic apparatus as claimed in claim 10, wherein the decision module is implemented by the central processing unit executing a programmable instruction.

14. The electronic apparatus as claimed in claim 10, wherein each system temperature tag includes a system temperature value corresponding to the associated set of temperature and working of the electronic component, and environmental temperature of the electronic device, and the decision module is configured to compare the system temperature value with a threshold value and generate the overheating signal when the system temperature value exceeds the threshold value.

15. The electronic apparatus as claimed in claim 10, wherein the system temperature is indicated by each system temperature tag corresponding to an overheated system temperature of the electronic apparatus including an overheating mark, and the decision module is configured to analyze the system temperature tag to determine whether it contains the overheating mark and generate the overheating signal when the overheating mark is present.

16. The electronic apparatus as claimed in claim 10, wherein the low-power operation mode comprises reducing the operating clock rate of the electronic apparatus, switching the electronic apparatus into suspend mode, switching the electronic apparatus into low-power sleep mode, switching the electronic apparatus into power-off mode, or raising the revolution rate of a fan in the electronic apparatus.

17. The controlling method as claimed in claim 1, wherein the step of obtaining the current working power comprises obtaining the current and the voltage supplied to the electronic component and driving the current working power according to the current and the voltage.

18. The electronic apparatus as claimed in claim 10, the power-detection element is connected to the electronic component and configured to obtain the current and the voltage supplied to the electronic component.

19. The controlling method as claimed in claim 1, wherein the step of obtaining the current temperature comprises directly detecting a temperature of the electronic component by a temperature-detection element independently of the current working power of the electronic component.

20. The controlling method as claimed in claim 2, wherein the step of obtaining the current temperature comprises directly detecting a temperature of the electronic component by a temperature-detection element independently of the current working power of the electronic component.

* * * * *